US009623771B2

(12) United States Patent
Jeong et al.

(10) Patent No.: US 9,623,771 B2
(45) Date of Patent: Apr. 18, 2017

(54) ROD ADAPTER FOR OPERATING RECLINER AND SEAT RECLINING DEVICE COMPRISING THE SAME

(71) Applicant: AUSTEM CO., LTD., Ceonan-si (KR)

(72) Inventors: Tae Joo Jeong, Ansan-si (KR); Se Young Park, Incheon (KR)

(73) Assignee: AUSTEM CO., LTD., Ceonan-si (KR)

( * ) Notice: Subject to any disclaimer, the term of this patent is extended or adjusted under 35 U.S.C. 154(b) by 0 days.

(21) Appl. No.: 14/411,052

(22) PCT Filed: Jul. 3, 2014

(86) PCT No.: PCT/KR2014/005940
§ 371 (c)(1),
(2) Date: Dec. 23, 2014

(87) PCT Pub. No.: WO2015/023058
PCT Pub. Date: Feb. 19, 2015

(65) Prior Publication Data
US 2016/0214508 A1    Jul. 28, 2016

(30) Foreign Application Priority Data
Aug. 12, 2013    (KR) .................... 10-2013-0095112

(51) Int. Cl.
*B60N 2/22*    (2006.01)
*B60N 2/20*    (2006.01)
*B60N 2/68*    (2006.01)

(52) U.S. Cl.
CPC ............. *B60N 2/22* (2013.01); *B60N 2/20* (2013.01); *B60N 2/682* (2013.01); *B60N 2205/50* (2013.01)

(58) Field of Classification Search
CPC ............. B60N 2/20; B60N 2/22; B60N 2/682
(Continued)

(56) References Cited

U.S. PATENT DOCUMENTS

| 3,401,979 A * | 9/1968 | Putsch ................. B60N 2/2252 297/362 |
| 4,470,633 A * | 9/1984 | Fourrey .................. B60N 2/22 16/DIG. 24 |
| 2005/0099049 A1* | 5/2005 | Spey ........................ B60N 2/22 297/361.1 |

FOREIGN PATENT DOCUMENTS

CN    2763121 Y    3/2006
KR    1020030040957 A    5/2003
(Continued)

*Primary Examiner* — Milton Nelson, Jr.
(74) *Attorney, Agent, or Firm* — Schmeiser, Olsen & Watts LLP

(57) ABSTRACT

The present invention relates to a rod adapter for operating recliner and a seat reclining device comprising the same, where the seat reclining device comprises a fixed frame; a rotating frame rotatably coupled to the fixed frame; a recliner coupled to the fixed frame at one side and to the rotating frame at the other side to adjust rotation angle of the rotating frame; a shaft rod penetrating the fixed frame, the rotating frame and the recliner; a recliner lever provided rotatable around a shaft receiving part disposed coaxially to an end part of the shaft rod; and a rod adapter disposed between the shaft rod and the recliner lever and having a rod inserting recess part where the shaft rod is inserted and a lever shaft part which is inserted into the shaft receiving part of the recliner lever so that it intermediates between rotations of the shaft rod and the recliner lever. Therefore, compatibility between the recliner lever and the shaft rod as components of the seat reclining device can be enhanced.

4 Claims, 6 Drawing Sheets

(58) Field of Classification Search
USPC .................................................. 297/362.12
See application file for complete search history.

(56) References Cited

FOREIGN PATENT DOCUMENTS

| KR | 100844355 B1 | 7/2008 |
|---|---|---|
| KR | 1020090099997 A | 9/2009 |
| KR | 1020100113839 A | 10/2010 |

* cited by examiner

ROD ADAPTER FOR OPERATING RECLINER AND SEAT RECLINING DEVICE COMPRISING THE SAME

TECHNICAL FIELD

The present invention relates to a rod adapter for operating recliner and a seat reclining device comprising the same used in the field of a vehicle seat to connect a recliner for adjusting rotating angle of a seatback relative to a seat cushion with a lever for operating rotation of the recliner.

BACKGROUND ART

As shown in FIG. 1 and FIG. 2, a conventional seat reclining device 1 comprises a fixed frame 2 which is fixed to a seat cushion part (not shown) and a rotating frame 3 which is fixed to a seatback part and rotatably connected to the fixed frame. A recliner 4 is interposed between the fixed frame 2 and the rotating frame 3 to be operated to adjust rotation angle of the rotating frame 3 with regard to the fixed frame 2.

The recliner 4 is coupled to the fixed frame 2 at its one side and coupled to the rotating frame 3 at the other side to be operated to lock or release a relative rotation between both sides through an inner mechanism. Such an operation is accomplished by rotating operation of a shaft rod 6 which passes through a cam 5 at the center part to rotate integrally therewith.

To a user, the rotating operation of the shaft rod 6 is accomplished through a recliner lever 7 into which the shaft rod 6 is inserted at its axial end part.

In this case, a rod inserting recess part 8 is formed at the recliner lever 7 to have the same cross section as the shaft rod 6. Therefore, the recliner lever 7 and the shaft rod 6 can rotate integrally therebetween.

However, according to the conventional seat reclining device 1 as described above, the manufacturing sources can be different among the components constituting the seat reclining device 1. Therefore, if the cross section of the shaft rod 6 for the rotating operation of the recliner 4 is different from that of the rod inserting recess part 8 formed at the recliner lever 7, the compatibility between these components cannot be achieved.

DISCLOSURE

Technical Problem

Accordingly, it is an object of the present invention to provide a rod adapter for operating recliner and a seat reclining device comprising the same which can enhance compatibility between a recliner lever and a shaft rod as components of the seat reclining device.

Technical Solution

In order to accomplish the above object, the present invention provides a seat reclining device comprising: a fixed frame fixed to a seat cushion part; a rotating frame fixed to a seatback part to be rotatable with regard to the fixed frame; a recliner interposed between the fixed frame and the rotating frame so that it is coupled to the fixed frame at one side and to the rotating frame at the other side, and operated to adjust rotation angle of the rotating frame with regard to the fixed frame; a shaft rod provided to penetrate the fixed frame, the rotating frame and the recliner and rotated to operate the recliner; a recliner lever provided rotatable around a shaft receiving part disposed coaxially to an end part of the shaft rod; and a rod adapter disposed between the shaft rod and the recliner lever, and having a rod inserting recess part where the end part of the shaft rod is inserted and a lever shaft part which extends coaxially with the rod inserting recess part to be inserted into the shaft receiving part of the recliner lever so that it intermediates between rotations of the shaft rod and the recliner lever.

According to an aspect of the present invention, the shaft receiving part of the recliner lever has a different cross section from that of the shaft rod, and the rod adapter has the rod inserting recess part having the same cross section as the shaft rod and the lever shaft part having the same cross section as the shaft receiving part.

In order to accomplish the above object, the present invention also provides a rod adapter for operating recliner which is applied to a seat reclining device comprising a fixed frame fixed to a seat cushion part; a rotating frame fixed to a seatback part to be rotatable with regard to the fixed frame; a recliner interposed between the fixed frame and the rotating frame so that it is coupled to the fixed frame at one side and to the rotating frame at the other side, and operated to adjust rotation angle of the rotating frame with regard to the fixed frame; a shaft rod provided to penetrate the fixed frame, the rotating frame and the recliner and rotated to operate the recliner; and a recliner lever provided rotatable around a shaft receiving part disposed coaxially to an end part of the shaft rod, wherein the rod adapter is disposed between the shaft rod and the recliner lever and it has a rod inserting recess part where the end part of the shaft rod is inserted and a lever shaft part which extends coaxially with the rod inserting recess part to be inserted into the shaft receiving part of the recliner lever so that it intermediates between rotations of the shaft rod and the recliner lever.

According to an aspect of the present invention, the rod inserting recess part and the lever shaft part have different cross sections therebetween.

Advantageous Effects

According to the rod adapter for operating recliner and the seat reclining device comprising the same of the present invention as described above, even if the cross section of the shaft rod for operating the recliner is different from that of the shaft receiving part of the recliner lever to be coupled to the shaft rod because of the difference in their manufacturing sources or other reasons, a mutual connection can be achieved by interposing the rod adapter therebetween, so that the compatibility of the recliner lever and the shaft rod can be increased.

BEST MODE

Figure 3:
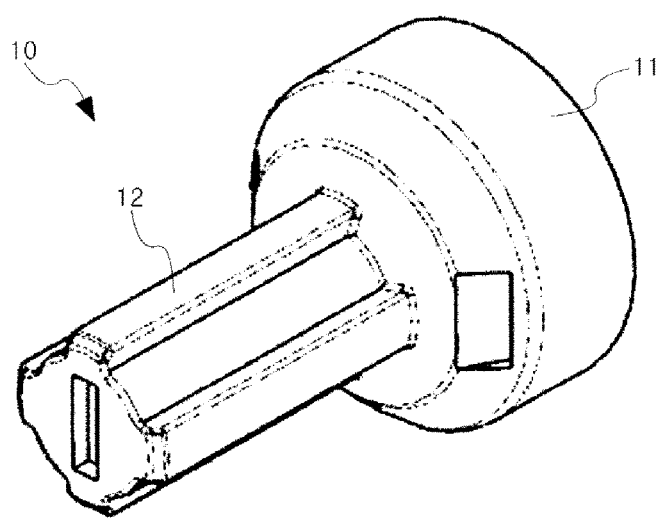
FIG. 3 is a perspective view of a rod adapter for operating recliner according to an exemplary embodiment of the present invention.
Figure 4:
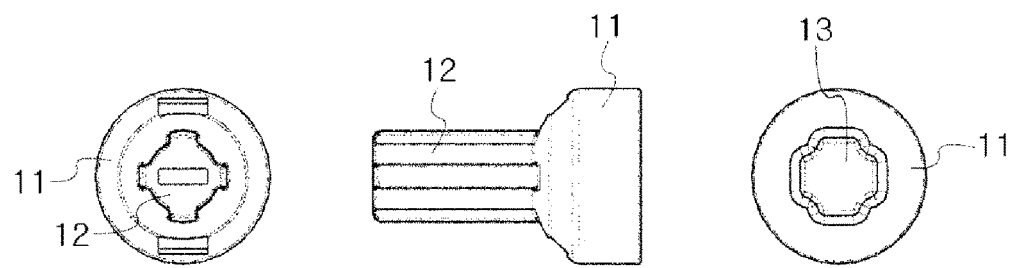
FIG. 4 are front view and left and right side views of the rod adapter for operating recliner in FIG. 3.

As shown in FIG. 3 and FIG. 4, a rod adapter 10 for operating recliner according to an exemplary embodiment of the present invention comprises a rod receiving part 11 at one side and a lever shaft part 12 at the other side which are formed integrally to extend in the opposite direction along the same axis.

The rod receiving part 11 has at its inner center part a rod inserting recess part 13 to extend in the direction of the axis.

In this embodiment, the lever shaft part 12 has a different cross section from that of rod inserting recess part 13.

Figure 5:
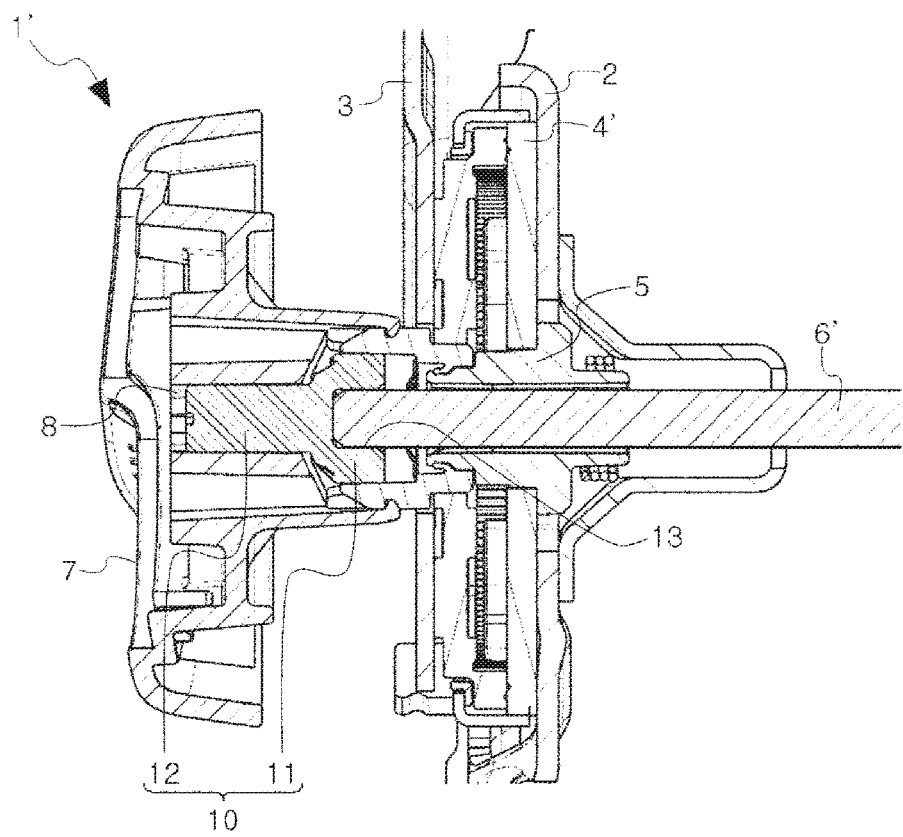
FIG. 5 is a cross section view of a principal part of a seat reclining device according to an exemplary embodiment of the present invention.

As shown in FIG. 5, the rod adapter 10 as described above is applied in the form of interposing between a shaft rod 6' and a recliner lever 7 in a seat reclining device 1'.

Figure 1:
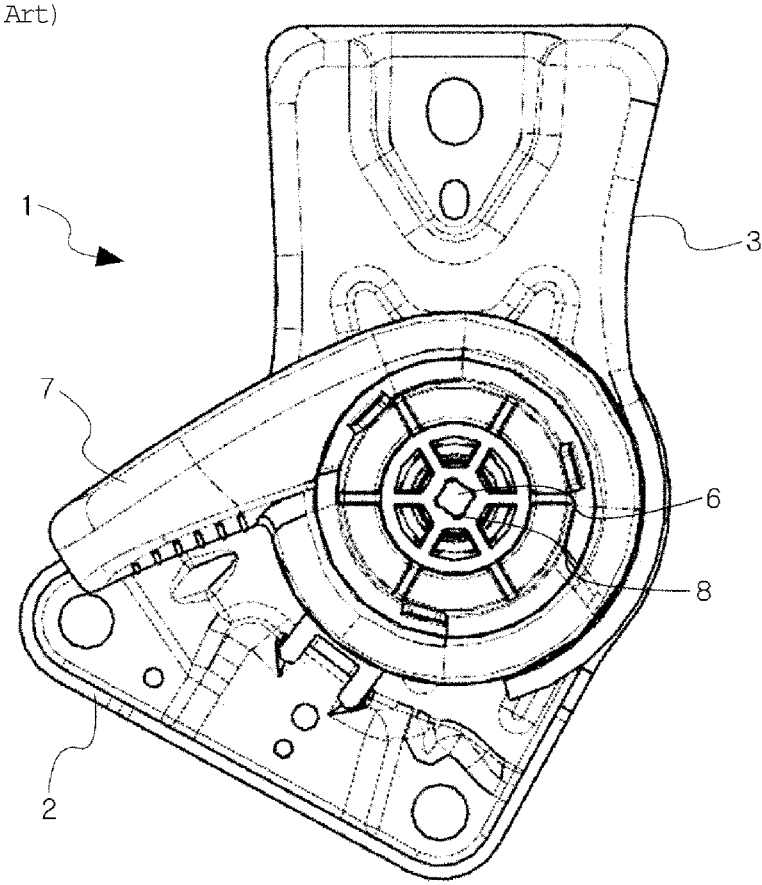
FIG. 1 is side view of a principal part of a seat reclining device according to a conventional art.
Figure 2:
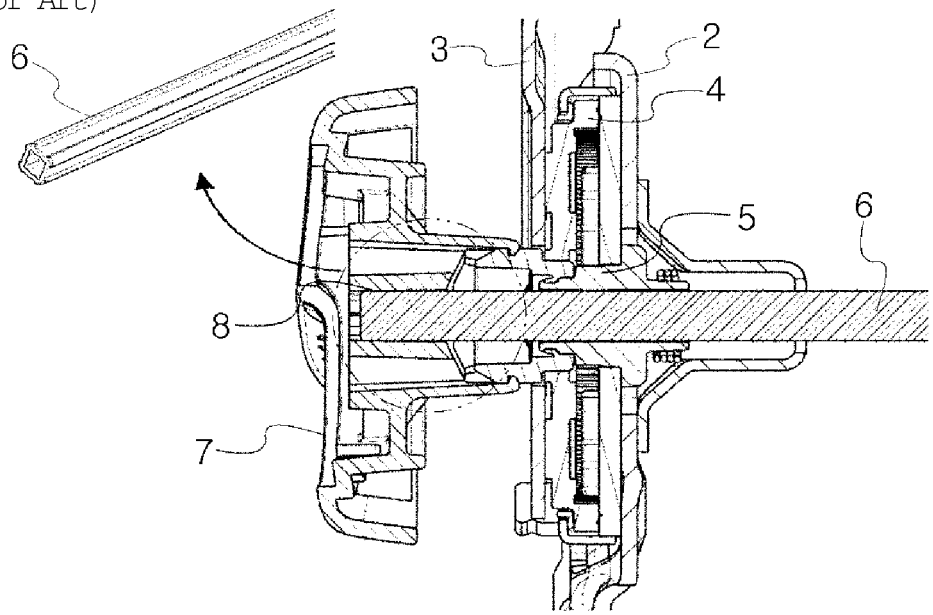
FIG. 2 is a cross section view of the principal part of the seat reclining device in FIG. 1.

The seat reclining device 1' according to an exemplary embodiment of the present invention is similar to a conventional seat reclining device 1 (refer to FIG. 1 and FIG. 2). But, the cross section of the shaft rod 6' has a different shape from that of the shaft receiving part 8 of the recliner lever 7 due to a difference between the manufacturing source of the recliner 4', the shaft rod 6' and etc. and the manufacturing source of the recliner lever 7.

Figure 6:
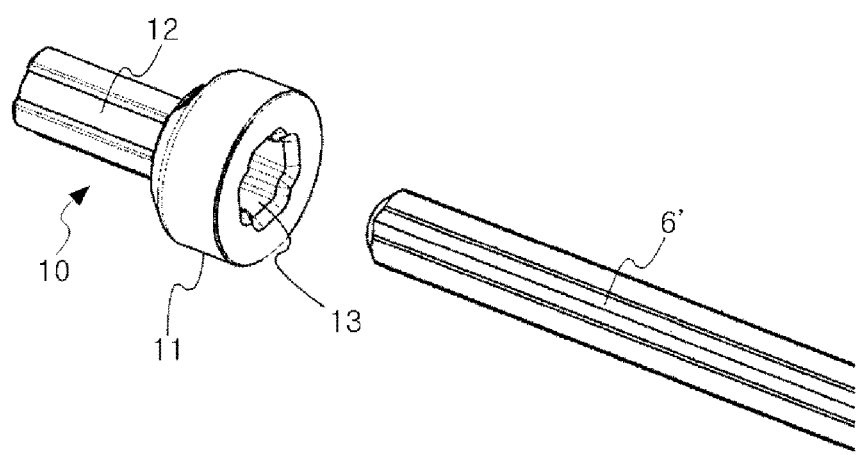
FIG. 6 is a perspective view of principal components which are separated from the seat reclining device in FIG. 5.

In this case, as the rod inserting recess part 13 of the rod adapter 10 has the same cross section as the shaft rod 6', one end part of the shaft rod 6' is inserted into the rod inserting recess part 13 (refer to FIG. 6). However, as the lever shaft part 12 extending along the same axis but in the opposite direction from the rod inserting recess part 13 has the same cross section as the shaft receiving part 8 of the recliner lever 7, it is inserted into the shaft receiving part 8.

Therefore, the rod adapter 10 and the shaft rod 6' and the recliner lever 7 which are coupled therebetween by the intermediation of the rod adapter 10 can be integrally rotated around the same axis.

Although the rod adapter 10 for operating recliner and the seat reclining device 1' according to the exemplary embodiment of the present invention have been disclosed, various modifications, additions and substitutions are possible, without departing from the scope and spirit of the invention. Therefore, the above embodiment must be regarded as one example provided for description of the present invention, rather than to limit the present invention.

The invention claimed is:

1. A seat reclining device comprising:
a fixed frame fixed to a seat cushion part;
a rotating frame fixed to a seatback part to be rotatable with regard to the fixed frame;
a recliner interposed between the fixed frame and the rotating frame so that it is coupled to the fixed frame at one side and to the rotating frame at the other side, and operated to adjust rotation angle of the rotating frame with regard to the fixed frame;
a shaft rod provided to penetrate the fixed frame, the rotating frame and the recliner and rotated to operate the recliner;
a recliner lever provided rotatable around a shaft receiving part disposed coaxially to an end part of the shaft rod; and
a rod adapter disposed between the shaft rod and the recliner lever, and having a rod inserting recess part where the end part of the shaft rod is inserted and a lever shaft part which extends coaxially with the rod inserting recess part to be inserted into the shaft receiving part of the recliner lever so that it intermediates between rotations of the shaft rod and the recliner lever.

2. The seat reclining device according to claim 1, wherein the shaft receiving part of the recliner lever
has a different cross section from that of the shaft rod, and
the rod adapter has the rod inserting recess part having the same cross section as the shaft rod and the lever shaft part having the same cross section as the shaft receiving part.

3. A rod adapter for operating a recliner which is applied to a seat reclining device comprising a fixed frame fixed to a seat cushion part; a rotating frame fixed to a seatback part to be rotatable with regard to the fixed frame; a recliner interposed between the fixed frame and the rotating frame so that it is coupled to the fixed frame at one side and to the rotating frame at the other side, and operated to adjust rotation angle of the rotating frame with regard to the fixed frame; a shaft rod provided to penetrate the fixed frame, the rotating frame and the recliner and rotated to operate the recliner; and a recliner lever provided rotatable around a shaft receiving part disposed coaxially to an end part of the shaft rod, wherein the rod adapter is disposed between the shaft rod and the recliner lever and it has a rod inserting recess part where the end part of the shaft rod is inserted and a lever shaft part which extends coaxially with the rod inserting recess part to be inserted into the shaft receiving part of the recliner lever so that it intermediates between rotations of the shaft rod and the recliner lever.

4. The rod adapter for operating a recliner according to claim 3, wherein the rod inserting recess part and the lever shaft part have different cross sections therebetween.

* * * * *